Figure 1:
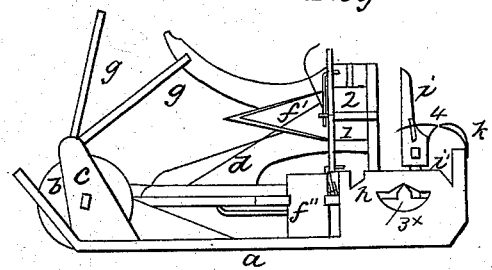

S. FULLER.
Mower.

No 112,579.  Patented March 14, 1871.

Witnesses  Inventor
Solomon Fuller
By Jeremy W. Bliss

UNITED STATES PATENT OFFICE.

SOLOMON FULLER, OF SOMERS, CONNECTICUT.

IMPROVEMENT IN MOWING-MACHINES.

Specification forming part of Letters Patent No. 112,579, dated March 14, 1871.

*To all whom it may concern:*

Be it known that I, SOLOMON FULLER, of Somers, county of Tolland and State of Connecticut, have invented certain new and useful Improvements in the Manufacture of Mowing-Machines; and to enable others skilled in the art to make and use the same I will proceed to describe its construction, referring to the drawing, in which the same letters indicate like parts in each of the figures.

The nature of this invention will be understood from the specification and drawing, in which—

Figure 2:
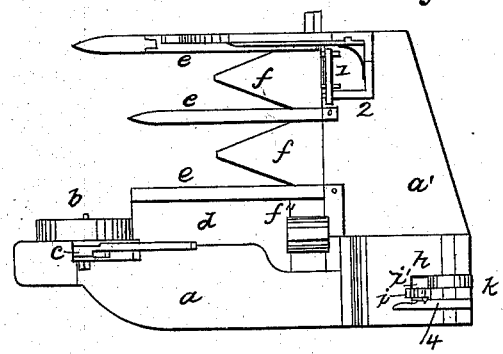
Figure 3:
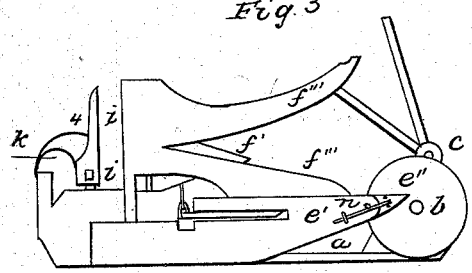

Figure 1 is an outside-end view. Fig. 2 is an inside-end view. Fig. 3 is a top view.

$a'$ is the finger-bar. $b$ is the ground-wheel, having its bearing upon an axis-pin secured in the post $c$. $d$ are shoe or fender plates, to protect or guide the grass or grain over the operating mechanism of the machine. $e$ are fingers, constructed and arranged in the common way. $e''$ is an adjustable nose-piece, hinged to the point of the divider. $f$ are cutters, constructed in the common way, except in one particular—the bevel is formed on the under side of the cutter instead of the upper side, the object of which will hereafter more fully appear.

$f'$ is a cutter, arranged to work and cut in a perpendicular line at right angles with the finger-bar $a'$. $f''$ is the cutter-bar, arranged in the common way.

The finger-bar $a'$, on which the cutter-bar $f''$ is arranged, is hinged in the box $h$, (see Fig. 1,) and will be more fully described hereinafter.

$g$ are guide-arms, to guide or conduct the grain or hay over the operating mechanism. $i$ is a vibrating lever, hinged to the hub $i'$, which is formed on or firmly secured to the finger-bar $a'$, and works up through an opening formed in the cap or box $h$. $k$ is a spring, secured to the rear portion of the shoe, and is for the purpose of pressing the fingers closely to the ground.

This cutting device is secured to the actuating-wheel portion of a machine, and operated in the common way.

By the use of this improvement I produce a self-regulating finger-bar, so constructed as to adapt itself to the uneven surface of the ground, easily passing medium-sized bogs and other obstructions without lifting up the finger-bar or subjecting the operator to the necessity of turning the same to elevate the points of the finger-guard by means of the lever $i$, thus relieving the driver from a close lookout for such impediments.

The inner end of the finger-bar, 3, which is attached and has its bearing in the shoe $a$, is made circular, so as to turn upward from a horizontal position with its guard-finger to any desired angular point, which circular end 3 is fitted and works in a semicircular opening or box, $h$, formed transversely on the shoe $a$. Upon the upper side of this bar, fitted within the box $h$, is attached a piece of steel, $x$, to extend above the bar, so as to reach the center of the semicircle in the cover of the box $h$, which forms a pivot or fulcrum on which the bar turns, to hold said bar firmly to the shoe; and to prevent its turning motion it has a post, $i'$, formed or firmly secured thereon at right angles to said bar, which passes up through a slot cut in the upper part of the semicircle or box $h$ of the shoe.

Against the back part of the upper end of said post $i'$ a spring, $k$, presses. This spring is attached to the shoe $a$, and has its bearing directly against the post $i'$, the action of which serves to keep the finger-guards lowered; but when the guards meet with a strong resistance the spring yields and allows the guards to be elevated, thereby allowing them to slide over the obstruction, on passing which the spring brings them instantly to a horizontal position, thus acting without aid or assistance from the driver to pass all ordinary obstructions; but in passing high bogs or from one level piece of ground to another, there is attached a lever, $i$, which is fitted to the upright post $i'$, by means of which the finger-bar is turned to elevate the finger-guards, and by means of notches formed in the holder 4, into and out of which the lever can be worked, and when the lever is so locked into one of said notches it is permanently held, thus holding the finger-guard at any desired upward angle; and on smooth ground, if it is desirable to hold the finger-guards permanently horizontal, without the slightest angle, then the lever may be secured in one of said notches; but when the operator or driver wishes to give up all care and watch over the self-regulating finger-bar, he un-notches the lever from the holder and leaves it to the control of the spring $k$.

At the inner or forward end of the shoe is attached a forked shoe-fender, $g$, extending back on the side of the shoe over the first finger-guard, to prevent the grass falling across the shoe, and thereby stopping the cutting of the upright grass by sliding over it as the machine moves forward. To the knife-bar $f''$ are fastened the knives, having their bevel formed on the under side, so as to cut on the upper edge or side of the slot in the finger-guard against steel plates, which, when the bevel is formed on the under side, should be removed from the lower side of said slot to the upper side. The upper part of the finger-guard $e$ extends back over the knife-bar $f''$ onto the finger-bar $a'$, through the ends of which pass bolts or screws down through the lower end of the finger-guard to hold the same to the finger-bar. By this arrangement the finger-guard is greatly strengthened, and by having the cut in the upper side of the slot clogging and stoppage of the knife-bar are prevented, which is usually occasioned by grass working into said slots.

The pressure upon the knives is always upward; hence there is always a close cut against the plate in the upper portion of the slot of the finger-guard, which cannot be the case where the cutting is from the under or lower edge of the blade. By this improvement less power is required to operate the knives through the grass.

At the forward end of the divider $e'$ is a joint, by which the point $e''$ is turned from a horizontal position, either upward or downward, to suit the ground or grass, and is held in its desired position by a spring bolt or latch, $n$, working on the side of said point. By this arrangement, in mowing lodged grass the point is turned down, which allows it to work under the grass. By this means the finger-bar is kept close to the ground. These points may be easily applied to all the points of the finger-guards.

Upon the divider is placed an upright cutter, $f'$, operating perpendicularly to the knife-bar $f''$, by means of which lodged clover and other grass is severed perpendicularly, which grass is then thrown aside by the track-clearer, making a clean path for the inside shoe on the next round. Thus lodged, clover is as easily mowed as upright grass, and when this cutter is not needed in such grass it can be readily removed. In the manufacture it is constructed of sheet metal, resembling somewhat a detached section of the horizontal knife-bar. The upper part of the stationary cutter $f''''$ toward the point is circular and turned up, so as always to ride above and be over the grass. The lower part is turned angularly down, so as always to move under the grass.

The knife $f'$ is of the common form, having two cutting-edges, made to slide up and down, cutting against the edges of the two above-named parts $f'''$. This knife $f'$ is attached to a pitman, which is connected to one arm of an elbow-lever, 1. The other arm of the lever is connected by a pitman to the knife-bar $f''$. Said lever is supported on the end of an axle, 2, running out angularly from said cutter. Now, when the horizontal knife-bar moves, the upright cutting-knife moves also by means of this connection; and to prevent the grass clogging the operation of this cutter, a fender, $d$, is placed in front of said lever, and is fastened to the axle of said lever and to a point forward on the divider.

What I claim, and desire to secure by Letters Patent, is—

1. The finger-bar jointed to the shoe, as described, in combination with the lever $i$, holder 4, and spring $k$, arranged and operating as set forth.

2. In combination with the divider $e'$ and nose-piece $e''$, made adjustable by spring-catch $n$, the cutters $f\ f'''$, constructed and operating as described.

SOLOMON FULLER. [L. S.]

Witnesses:
LEONARD BILLINGS,
C. FULLER.